United States Patent
Riedl et al.

(10) Patent No.: US 12,535,240 B2
(45) Date of Patent: Jan. 27, 2026

(54) NETWORKED ELECTRIC BASEBOARD THERMOSTAT AND MASTER CONTROL SYSTEM

(71) Applicant: SER Consulting LLC, Breckenridge, CO (US)

(72) Inventors: Steven Riedl, Atlanta, GA (US); Rene Juneau, Ontario (CA)

(73) Assignee: SER CONSULTING LLC, Breckenridge, CO (US)

( * ) Notice: Subject to any disclaimer, the term of this patent is extended or adjusted under 35 U.S.C. 154(b) by 745 days.

(21) Appl. No.: 17/850,260

(22) Filed: Jun. 27, 2022

(65) Prior Publication Data
US 2022/0412594 A1 Dec. 29, 2022

Related U.S. Application Data

(60) Provisional application No. 63/215,484, filed on Jun. 27, 2021.

(51) Int. Cl.
| | |
|---|---|
| *F24F 11/00* | (2018.01) |
| *F24F 11/63* | (2018.01) |
| *G05B 19/042* | (2006.01) |
| *G05D 23/19* | (2006.01) |
| *F24F 110/10* | (2018.01) |
| *F24F 140/00* | (2018.01) |

(52) U.S. Cl.
CPC ............ *F24F 11/63* (2018.01); *G05B 19/042* (2013.01); *G05D 23/1927* (2013.01); *F24F 2110/10* (2018.01); *F24F 2140/00* (2018.01); *G05B 2219/2614* (2013.01)

(58) Field of Classification Search
CPC ............................ F24F 11/63; G05D 23/1927
See application file for complete search history.

(56) References Cited

U.S. PATENT DOCUMENTS

| | | | | |
|---|---|---|---|---|
| 7,789,129 B1 * | 9/2010 | Barden | ............... | F24D 19/0087 165/53 |
| 10,782,044 B1 * | 9/2020 | Bart | ................... | G05D 23/1919 |
| 2008/0116840 A1 * | 5/2008 | Welchko | ........... | H02M 7/53875 318/801 |
| 2011/0184564 A1 * | 7/2011 | Amundson | ........ | G05D 23/1923 700/278 |
| 2018/0231260 A1 * | 8/2018 | Wilson | ................. | G08B 21/182 |
| 2018/0266718 A1 * | 9/2018 | Gillette | .................... | F24F 11/64 |

* cited by examiner

*Primary Examiner* — Mark A Connolly
(74) *Attorney, Agent, or Firm* — Stephen J. Weyer, Esq.; Stites & Harbison, PLLC (57) ABSTRACT

A system and method include a computer processor, computer memory associated with the computer processor and a network interface. A plurality of temperature sensors are each associated with a respective electric heating element. Optionally, in one form, the plurality of sensors are associated with the computer processor wherein the temperature sensors send respective signals to the computer processor via the network interface. The computer processor is programmed to provide varying amounts of power to one or more of the electric heating elements based on signals sent to the computer processor.

16 Claims, 3 Drawing Sheets

NETWORKED ELECTRIC BASEBOARD THERMOSTAT AND MASTER CONTROL SYSTEM

FIELD OF THE INVENTION

The present invention relates to a thermostat and control system and in particular a networkable electric baseboard thermostat and master control system.

BACKGROUND OF THE INVENTION

Prior known electric baseboard control systems use multiple independent thermostats. Each of the thermostats run on a separate set of one or more electric baseboard heaters.

Many prior known "Internet of Things" (IoT) or smart thermostats currently exist for whole house or building HVAC systems. These systems are mainly designed for systems like furnaces with low voltage control interfaces and are not capable of handling a high voltage control or other characteristics of electric baseboard heat systems.

Some additional disadvantages with prior electric baseboard heat systems are that some of the "connected" high voltage baseboard thermostats are wall mounted and usually the wall mounted controls (i.e. thermostats) control multiple baseboard electric units. As a result, the wall mounted thermostats are incapable of delivering fine adjustments to control multiple baseboard electric units which are on the same circuit as the thermostat (controller).

For example, a room may have two or more baseboard electric heaters controlled by a single wall thermostat controller. Simply, the controller cannot effectively and separately control each of the multiple baseboard electric heat units. In fact, the baseboard electric heater closest to the wall mounted thermostat controller is likely the one which will most effect readings on the wall mounted thermostat controller. As a result the wall mounted thermostat controllers cannot effectively be adapted to accurately control each of the baseboard units separately, for example to control only a baseboard unit closest a heat loss zone, and preferential over any of the other baseboard units in a room to properly control the correct temperature across an entire room or the entire dwelling.

Further, prior electric baseboard systems ignore any source of information other than the temperature at the thermostat. This ignores a significant amount of other information that may be available and ignores aspects such as time of day, sunlight, temperature outside (presently or forecaster for the day), cross correlations between nearby baseboard electric units and other information and multiple sensors that can be used to make the heating system more efficient and more consistent accurate control of temperature throughout an entire dwelling.

Prior known baseboard heater systems deploy a number of individual baseboard heaters and a number of thermostats to control the baseboard heaters. The number of thermostat controllers is determined by the number of baseboard heaters required and the connection and power delivery limits of each thermostat. For larger, multi-unit buildings or groups of buildings, centralized control systems only work for heating, cooling and other environmental control systems designed specifically for centralized management and control and are not adaptable to individual elements that are not engineered as part of the controlled system.

Furthermore, there is no control over other devices that can impact environmental or energy consumption factors that may be of use for environmental or power consumption control, and where it may be advantageous to control such other devices based on environmental factors at the device's location or on external conditions that may be used to control the devices.

SUMMARY OF THE INVENTION

The present system and method overcome deficiencies in prior electric baseboard heating systems by providing more accurate and individual control of respective baseboard heating elements to allow for a more consistent temperature present throughout a dwelling. In varying forms, a computer or central processor or controller with a plurality of temperature sensors are deployed and associated with respective electric baseboard heating elements or heaters. The system and method includes software that can learn how a dwelling reacts to external and controlled actions (e.g. actions taken by the central processor) to dynamically control respective electric baseboard heaters and thereby better control a temperature throughout a dwelling. Further, the system and method is adapted to minimize the electricity usage or power consumption.

The present system and method is highly adaptable taking into account the size of a dwelling, the number of baseboard heaters, the number of windows and other environmental elements.

The present system and method also can be used to integrate with a neighborhood's electrical infrastructure which may include shared or aggregated solar panels and electricity storage devices that one may want to regulate heating based on current solar or battery conditions to manage power consumption for multiple sources.

The present invention, in one form thereof is directed to a thermostat system. The system includes a computer or central processor, computer memory associated with the computer processor and a network interface. In an advantage implementation or form, a plurality of temperature sensors are each associated with a respective electric heating element or electric heater, ambient temperature or switching device temperature. The plurality of temperature sensors are associated with the computer processor wherein the temperature sensors send respective signals to the computer processor. The computer processor is programmable to provide varying amounts of power to one or more of the electric heating elements based on signals sent to the computer processor.

In various forms, the thermostat system has a network interface selected from the group consisting of Powerline, Mesh (Thread, Matter), Bluetooth, Ethernet and/or Wi-Fi.

The computer processor in one specific form can perform an iterative process. This process includes receiving first temperature data from the sensors. The temperature data received from the sensors are stored in computer memory. The computer processor determines necessary temperature settings for one or more of the electric heating elements. The temperature settings are stored in memory. The processor receives second temperature data from the sensors. Finally, the computer processor compares the second temperature data with data stored in memory from prior stored temperature data and prior stored temperature settings determined from historic data in memory to set a subsequent power setting to thereby alter or update temperature settings for the heaters each time the iterative process runs.

The present system and method have advantages and features which are not possible from existing electric baseboard heater systems. For example, it is not feasible for currently available electric baseboard heaters to be individually controlled using the present system and method. While there are prior known baseboard electric heaters with integrated radio and possibly a central thermostat controller, the central thermostat controller controls multiple heaters using a single temperature setting set by the thermostat controller. As a result, the prior known systems cannot individually and separately control and vary heat among different or more than one heating element to which the thermostat controller controls.

Further, while there are IoT thermostats that are wall mounted and used to control multiple baseboard heaters, these prior controllers have no intelligent coordination between each of the separate baseboard heaters. Their number and size have to be managed and connected to handle the maximum load supported by the circuit and you cannot easily extend the circuit to a new room as it is outside the temperature measurement in the other room. There are low voltage thermostats designed to control central systems that emulate better control with separate room or temperature sensors, but require adding relays or other devices to indirectly control a baseboard thermostat, but this is cost prohibitive for the larger number of baseboards in a house and is complex to setup and still does not manage the unique characteristics of electric heat.

The present system and method is designed to overcome these and other limitations of prior known systems.

BRIEF DESCRIPTION OF THE FIGURES

The present invention will now be described with reference to the drawings as follows.

DETAILED DESCRIPTION

Definitions

The following definitions are used throughout this disclosure:

The term "baseboard", when used on its own, refers to an electric baseboard heater.

"Electric baseboard heater", "baseboard heater", "electric baseboard" and "baseboard" are used interchangeably.

"Housing" refers to the metal enclosure of an electric baseboard heater.

The terms "thermostat", "controller's thermostat" "master system controller 150", "computer controller" and "controller" are used interchangeably to refer to the systems and methods of the present controller of this disclosure or of multiple separate processing elements used to implement the controller.

In some instances of this disclosure, the baseboard heater controller may have at least one of the following characteristics:

1. Networked using open standard protocols.
    a. Mesh network (Thread, Zigbee, Zwave) allow for more range, reliability, no Internet needed, not depend on Wi-Fi router. Having a large number of AC connected mesh devices expands the range and reliability of the network as well so that battery powered "sleepy" devices can be used for additional sensors (Door, Window, Temperature, wall control).
    b. Bluetooth for ubiquity or commissioning to the mesh network.
    c. Wi-Fi could also be used but would not have all of the advantages. If your Internet or Wi-Fi router broke that would be a single point of failure and lack of temperature control can have serious consequences for a dwelling.
2. Retrofittable to most existing baseboards. This device is designed and sized to fit in the junction box that is in all baseboard heater units to connect the mains power.
3. Allows baseboard heater additions up to the maximum circuit capacity. Wall mounted thermostats are usually limited in the power they can control with 1500 watts as a typical number. A 20 amp 240V can run up to 3800 watts and would require a more complicated and expensive wiring scheme to utilize the power available.
4. Allows baseboard heaters in different rooms to be on the same circuit but have individual temperature control. When an addition is put on a house or a room is divided, it may not be possible with existing wall thermostats to separately control the room temperatures with existing wall thermostats.
5. Can intelligently manage the power applied based on the baseboard heater type (hydronic or standard) to achieve the desired control outcome with minimal energy input (keep the element temperature or monitor phase change materials to control how much latent heat will be needed for future adjustments). This can be done with a temperature sensor on the heating element. Wall based thermostats can only measure the local temperature and not the element directly. This can also be used to be able to set a lower max element (and housing) temperature if required for safety reasons for example if the baseboard is in a child's room.
6. Can operate independently or connected.
7. Programmable and settable independently by a room wall transmitter, smartphone app locally using Bluetooth, Home Assistant (e.g. Apple Homekit™ or Google Home™), or Internet connected device.
8. Cost effective for a large number of baseboards in a household.

The control systems and methods of this disclosure cover more than the electric baseboard heaters. Existing systems, for example window air conditioners, do not have the capability to report their local environmental data. While they could be controlled by "smart home" systems at the power outlet level, there is no provision for monitoring or reporting the environmental conditions at the location of the air conditioner. The present system can integrate these devices into the present control system though with the additional sensors to create a room, house/building, multi-building, campus or neighborhood level system.

The present system and method, in one advantageous form overcomes limitations of prior known baseboard heaters and other environmental controls that ignore a significant amount of information from one or more sources such as time of day, sunlight, cross correlations between nearby baseboards and other information that can be used to make the system more efficient and better regulate the house temperature. For instance, if the user requires a room temperature at 7 AM and one knows sunrise is at 6 AM, that the weather report is for no clouds and the room in question receives morning sun that would typically contribute a certain temperature rise, the present system and method can accommodate this information. Accordingly, in one embodiment the present system and method controls the temperature rise due to the heating element so that the sun effect does not cause us to overshoot the temperature desired.

In another embodiment, the system can learn over time how much energy or power needs to be supplied to the heating element over what time period to deliver the required outcome of temperature in a room. It will know the current room temperature, heating element temperature or other characteristic of a heating, cooling or other system, outside temperature and other factors such as time of day and can supply very close to the exact amount of power needed or operating time of the controlled device (e.g. heater) to get the room to the correct temperature without having to resort to more complex control methods such as PID. However, those well-known methods could also be used if desired. Similar sensors and control mechanisms can be used for heating, cooling, humidity and other environmental factors.

In another embodiment, since resistive heating elements change their resistance based on temperature, the power monitor may be able to infer the element temperature based on the power draw and use this instead of a actual temperature sensor mounted on the element. This would have to be calibrated for each element or possibly for each model of baseboard heater to which the thermostat is then paired.

In various forms, the present (1) systems and methods are adopted for one or more baseboard heaters (baseboards) using one or more environmental and other data sources on each baseboards to control the operation of the baseboard, (2) the means for the baseboard control systems (1) to communicate with each other or with one or more separate control systems (3) with said separate control systems (3) in turn having access to one or more environmental and other data sources, whether independently, in combination with the data available to baseboard controllers (1), or using data from other sensors and sources, and (4) methods and systems to allow the baseboard controllers (1) to work autonomously, as a group/swarm, or under the control of the control systems (3).

Further methods and systems that allow the control of the various permutations described to learn and adapt based on data available from all the sources, user behavior, and parameter settings to operate the baseboard controls in a manner that optimizes for one or more targets which can include preferences for one or more individuals in one or more management zones for comfort, energy efficiency, and where data sources may include information on or detection of said one or more individuals. Further methods and systems that provide for management for an aggregate of dwellings or buildings. Examples include but are not limited to multiple units in a condominium or apartment building; multiple homes or businesses in a neighborhood or city; and campus-level buildings and industries.

The baseboard sensor (i.e. thermostat) can be offered with additional sensors, or after learning how various baseboard models react to power input, a much simpler less complex version that is paired to a specific baseboard can be offered that will still have all of the mesh and learning advantages.

Figure 1:
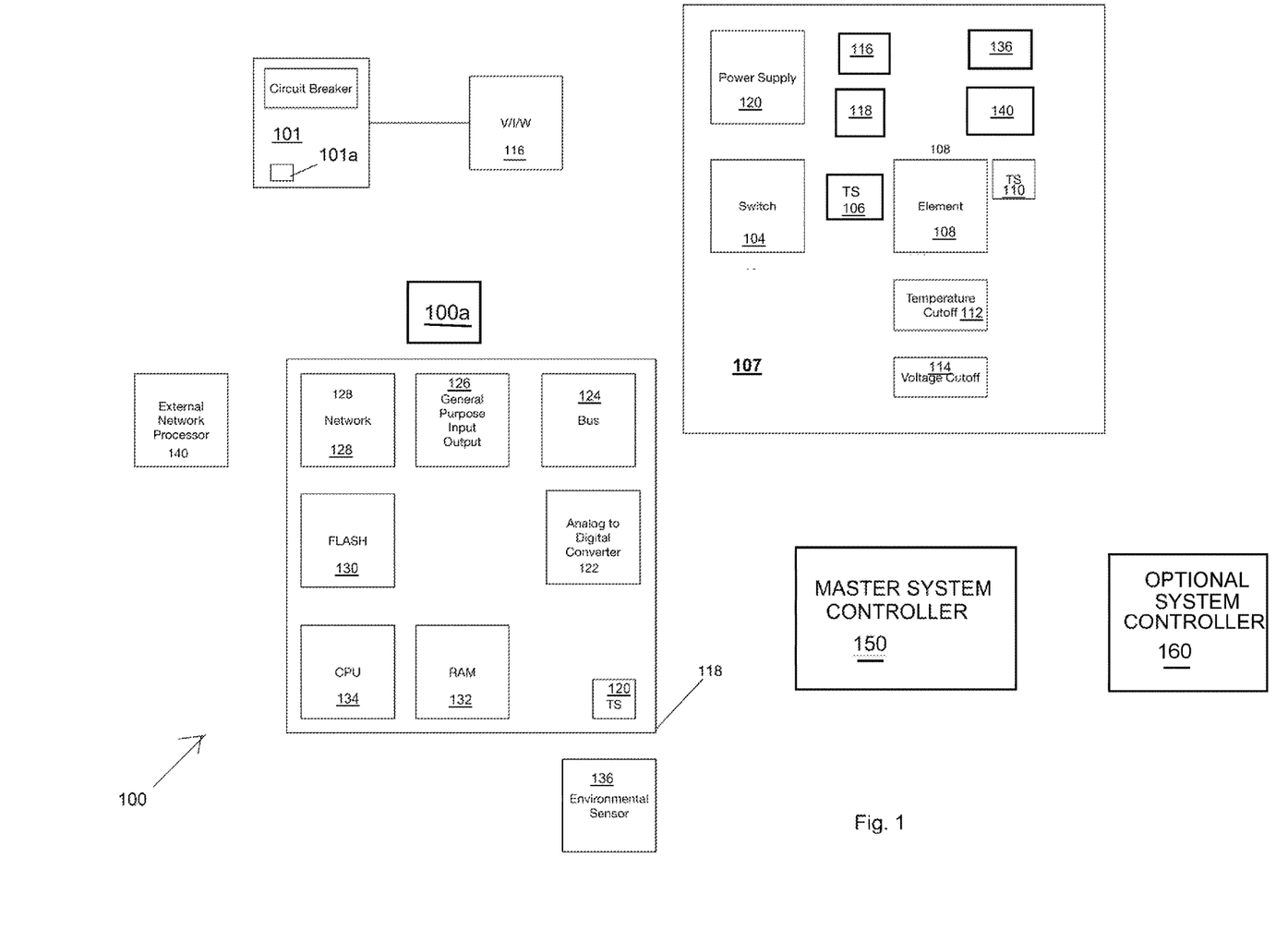
FIG. 1 is a high level schematic of a networked electric baseboard thermostat system in accordance with the present invention.
Figure 2:
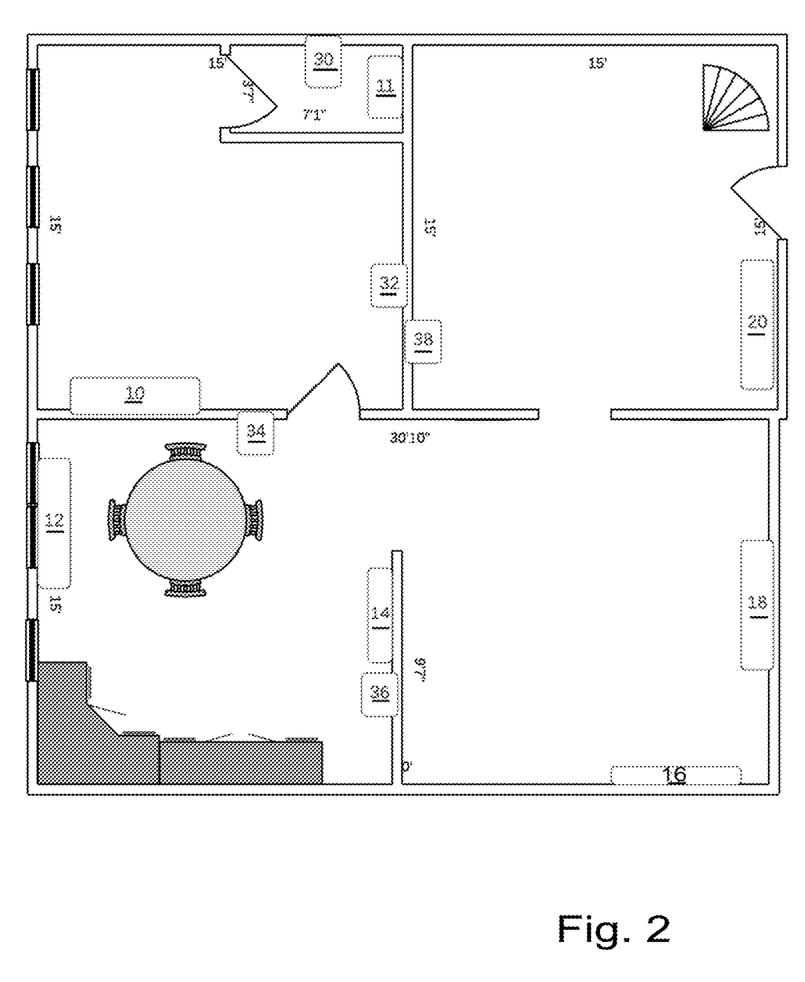
FIG. 2 is an example of a dwelling with various baseboards, windows, doors and sensors in accordance with the present system.

Referring now to the drawings and in particular FIG. 1, the following is a list of the elements shown in FIG. 1 identified with their description:

100—Networked electric baseboard thermostat system, that can used with a Master System Controller and/or an optional System Controller.

101—Circuit breaker—typically 20-30 Amp single pole 80-120V, double pole for 208-240V. 101a—Individual breaker.

102—Power Supply—typically supplies 10-1000 mA depending on the actual circuit components used. Can be isolated or non-isolated also depending on components used.

104—Switch—this can be a relay, triac, transistor or an integrated device such as a Zero-Cross Solid State Relay (SSR). It can be sized appropriate to the individual baseboard it is controlling or may be sized to the largest baseboards available (about 2500 Watts). The switch may also utilize an optocoupler for isolation and zero cross functions to minimize electro-magnetic radiation.

106—Temperature sensor on switch, this is mainly useful for electronic switches vs relays. This can be a simple thermistor or digital temperature sensor that has the range for the allowable temperature variations on the switch. This can be used to insure operating limits are not exceeded and may allow for smaller components such as heat-sinks.

107—Baseboard heater.

108—Baseboard heating element.

110—Temperature sensor on heating element. This can be a simple thermistor or digital temperature sensor that has the range for the allowable temperature variations on the element.

112—Temperature cutoff switch, this typically is factory installed on most baseboard thermostats to insure they do not go over a set temperature.

114—Voltage cutoff—Also typically installed by the factory on low voltage (120V) baseboards to insure they are not connected to a high voltage line.

116—Power monitor—This can be either a dedicated power monitoring chip with various voltage, current, power, zero cross detectors that is connected via a bus or it can also be discrete components (voltage dividers, shunt resistors) that use components on the microcontroller (118) to measure the power characteristics.

118—Network connected microcontroller ("controller").

120—Temperature Sensor—many microcontrollers of this type have integrated temperature measurement that is required for operation. If the microcontroller can be suitably positioned, this may be used also for ambient temperature sensing.

122—Analog to digital converter—This may be utilized as part of the power monitor or thermistor temperature sensors.

124—BUS—This may be used to communicate with external digital temperature sensors (106, 110, 134), power monitors (116) or switch (104) elements. This is typically an I2C, SPI or USB connection.

126—General Purpose Input Output—This may be utilized to sense input conditions such as zero crossings or control outputs such as the switch (104).

128—Optional Network interface—This can be any network connection although you would typically see a power line or wireless (Thread, Bluetooth, Wi-Fi) networking standard utilized. This can also be external to the main microcontroller as in (140).

130—Flash—This stores the program to perform the thermostat functionality. This is typically able to be securely reprogrammed over the network or a direct attached interface.

132—Random Access Memory (RAM)—Temporary storage for working variables.

134—Central Processing Unit (CPU)—Executes the program to control the baseboard and communicate with the network.

136—Environmental sensor—This element can be used to measure ambient temperature, humidity, pressure, light, motion, presence, gesture.

140—The networking component can be optionally moved off of the microcontroller to an external network processor.

150—Master System Controller—A controller for operations of the Networked electric baseboard thermostat.

160—Optional System Controller—an external, optional controller for the Networked electric baseboard thermostat.

The basic thermostat component 110 of the present baseboard controller 118 is made up of a subset of sensors on the enhanced thermostat (FIG. 1) that is installed in each electric baseboard heater 107 in the house. The master system controller 150 and/or other devices (e.g. additional environmental sensor(s) 136) of the present system 100 can be implemented using a central controller that can be a dedicated device in the household, a commonly available smart home hub, or a system elsewhere through a network connection, up to and including remote and "cloud" based systems.

In other embodiments or forms, the present systems and methods are designed to work with other building control systems such as optional system controller 160. A non-exhaustive list of possible optional system controllers 160 include Project Connected Home over IP/Matter, Google Home and Apple Homekit. Other such systems, often referred as "smart home" and building control systems, will be known to those of skill in the art.

The dwelling will typically have a breaker box 101 and breakers (101*a*) that supply power to the baseboards. Household power typically ranges from 80 V to 120V, 208 V, 220V or 240 V. Large commercial buildings have even higher voltages. Depending on the local wiring codes, these breakers are typically a maximum of 20 A although 30 A are also used, and higher for commercial buildings.

As an example in a residential building but not as a limit of the invention, on 240V you can use up to 3800 Watts of heater elements and on a 30 A circuit you can go up to 5700 Watts. However, the largest single residential baseboard units are typically 1500 Watts with many being 1000 or 500 watts. This is an advantage to individual thermostats as building a single wall mounted thermostat to handle 5700 watts is difficult, but a baseboard mounted unit that only has to handle 1500 watts or even sized to the unit and only handle 500 watts is much less complex to construct.

In one embodiment, the present system advantageously can operate baseboards in a safer manner if one element on one of the baseboards is partially shorted, other baseboards can continue operating. With the current state of thermostats, the shorted baseboard can draw excessive power and the whole chain of baseboards controlled by the thermostat will typically shut down by blowing a circuit breaker, or could cause overheating and fire, or in the event of a shutoff due to the breaker, result in room freezing and collateral damage.

One form of the method/system 100 uses a solid state power control element that is known of those of skill in the art (NXP AN467 2013) (ST AN2425 2006), as examples. The concept of using a solid state device with zero crossing control is well known in the literature.

In another specific form, an enhanced version of the baseboard controller includes a variety of additional sensors including 116 an AC line power monitor that can measure the line voltage, current and power. This device may have the capability to provide an AC line voltage and/or current zero cross signal and/or an alarm for an error condition. Some low voltage baseboard heaters contain a voltage cutoff 114 that will interrupt the current if it determines that the baseboard is hooked up to a higher voltage then specified for the device. This function could be replaced by the line voltage monitor to reduce costs. The heating ability of the baseboard is directly proportional to the applied voltage, so the ability to monitor line voltage can allow the system to better control the baseboard.

Either implementation could be made to monitor the current on the hot and neutral lines to create a ground fault interrupter as well to enhance the safety of the device. In another embodiment, this type of control is used for controlling electric floor heat systems.

The system 100 can have one or more additional temperature sensors 100*a* to measure the ambient temperature determined by CPU 134 and one or more connections to other systems such as fire alarm and sprinkler systems. If the microcontroller CPU 134 can be positioned in an appropriate place, it may have an internal temperature sensor 120. If the ambient temperature increases significantly this could be a sign of a fire in the area and a fire alarm could be sounded. As there are many mesh connected fire alarms available today, this could be done be relaying a signal to the fire alarms to go off, as well as notifications to the homeowner or fire department.

In another specific implementation, temperature sensor 106 can be placed adjacent to the switch element 104 to ensure that the operational limits of the switch device are not exceeded which can cause an unsafe condition. Most solid state switch device have a maximum junction operating temperature of 125 to 150 degrees Celsius and can potentially get stuck in the ON state if this is exceeded which is a safety issue. System 100 can be designed with proper heat dissipation mechanisms such as, for example, a heat sink so that under any load condition this does not occur. The temperature sensor 106 can be a backup device if the thermostat is installed incorrectly and requesting a higher load than it can deliver, or as the operating temperature is rarely above a reasonable room temperature, a more cost effective switch device and heatsink can be used. This is because the device can have a maximum ambient temperature of, for example, 25 degrees Celsius which is well below the maximum operating temperature and the device heat can easily be extracted and help heat the room at the same time. In another embodiment, system 100 uses the metal enclosure of the baseboard 107 as a heat sink to further reduce costs.

A temperature sensor 110 can be used on the heating element 108 to determine how applying power to the element causes it to heat up. This is a unique feature of the invention that cannot be duplicated by a wall mounted unit. Some elements 108 are purely a resistive heater, others enclose the heater in a liquid that may exhibit a phase change and have nonlinear properties both on heating and cooling. A baseboard heater 107 typically has a thermal cutoff 112 that interrupts the current flowing through the device when a limit is reached. In one embodiment, sensor 110 is used to replace this cutoff. This may require additional safety certification of the device and software. The element temperature can also be set to a lower value than the cutoff for safety reasons, for example, the heater is in a children's room.

Each controller could act alone, this may be the case where only a single baseboard is in a household. In another embodiment, the system and method of the controller is distributed among the microcontrollers 118 of the baseboard heaters so they operate as a swarm where the individual baseboards 107 communicate with each other and learn how they affect each other without a central controller. For instance, when one baseboard 107 decides to start heating it can broadcast that message out and other baseboards that have seen that action before and know how it will affect the temperature setting that they are monitoring so that they can use that information to decide what actions they may need to take to heat their space.

In other embodiments, the thermostat is used with fan based forced air units. In other embodiments, a switch or other control element known to those of skill in the art is used to separately control or vary the speed of the fan unit from the resistive heater. The control mechanism for the element temperature sensor 110 could be extended to the floor to control electric resistive floor heating mats or wires. One item to note is that electric floor heating systems typically have a floor temperature sensor, it is specifically instructed to not install the sensor near the heating element. System 100 would use a minimum of two sensors, one to measure the floor heat and one to measure the mat/wire temperature.

Advantages Over Prior Known Devices or Systems

While there are wall mounted smart thermostats they do not allow the control over individual baseboard units to allow usage to be optimized. With system-wide control, when a heating decision needs to be made, the system could use the least expensive element to generate the required temperature rise.

An embedded smart mesh baseboard thermostat has not been developed or deployed for sale. There are many manual and some programmable individual versions available. The manual version basically waste energy as someone must manually reach down and adjust it when they enter or leave a room, or for sleeping. The programmable version does not seem to be available anymore and was a poorly designed unit that would lose its programming on a power glitch or outage and the user had to go down to the floor and tediously reprogram the unit and set the time.

The controller of the system 100 can be implemented with its own user interface for managing system 100, or may use external interfaces, or both built in and external user interfaces. Example of external user interfaces for control can include and are not limited to: 1. Smartphone app using Bluetooth, or an IP connection to the device or a cloud server. 2. Home hub such as a Google Home Hub Max, Nest Hub second generation or Apple homePod mini or Apple TV 4K, for example. These devices would give voice or display control and may be able to act as an edge processor for the machine learning and control. 3. An optional wall control (FIG. 3) that has a network element, display and up/down temperature buttons. This unit would also typically have a temp sensor and could even be battery powered and operate as a sleepy end device. 4. Networked applications in any of the embodiments of the controller that are in turn controlled through other devices and interfaces such as HTML or other protocols known of those of skill in the art to interface with a web browser.

Control interfaces may be as simple as offering an up/down temperature button and a display. In another embodiment, the controller includes a network-accessed or physical interface to "factory reset" the device so that it can be paired with a different mesh system or some other change needed by the user. This can typically be a hidden switch that you use a bobby pin to push, or with high voltage safety considerations it could be a capacitive touch switch that you hold for a certain duration.

In one specific form, one or more elements of system 100 has no on/off switch and is always on. Baseboard thermostats typically have a max and min setting, and the default off condition may be to run at the min setting for freeze protection. The thermostat can then operate either at a fixed temp, a day/time based setting, various settings depending on external inputs (e.g. window, door, presence, motion sensors).

A thermostat embedded in the baseboard heater and other elements of the invention provide many advantages. These include the following nine items.

1. A readily available heat sink for the solid state device.
2. Typically metal construction for RF shielding although the network antenna must be outside the metal enclosure.
3. Direct control and temperature of each heating element.
4. Easily installed in existing units to extend their life.
5. Can be built and sized for the specific wattage of the unit.
6. Since the baseboard is powered by the building mains voltage, one easily available networking option is powerline networking.
7. Other networking methods such as Bluetooth, Wi-Fi, 802.15.4 and others are easily implemented and having multiple baseboards in a building helps create a mesh network. This would eliminate the need for additional mesh "repeater" devices in the unit.
8. Some baseboard heaters are now of the "Hydronic" type where they use a fluid to moderate the heat output. It may take longer for these units to heat up, typically to a lower temperature, but they will then use the fluid transitions to continue to output heat after the power is removed. Each baseboard is controlled independently and the best baseboard for the current heating needs can be optimally utilized. No matter what the baseboard type, the thermostat can model the power needed to be input to create a given temperature rise and the time period for that radiant heat to spread throughout the building along with the time for the elements (and fluid) to release the heat and cool down.
9. The device can also control the max temperature of the element. This may be useful in certain rooms or locations where you want a lower max temperature on the device for safety reasons. Some baseboards can also make expansion noises that can be controlled by monitoring the temperature and keeping it fairly constant while heating the room.

Using a microcontroller for TRIAC control has been done in prior art since at least 1999. It is very common to use this type of setup for controlling resistance electric heating elements used in electric baseboards, cooktops or even lab equipment. This is typically done using zero crossing detection and using half or full wave control of the heating element to modulate the temperature depending on how far off the temperature is and minimize RF interference. The present system 100 provides advantages and unique capabilities because it can learn and decide if any fine grained control of the element is required or if just turning the switch device on for a calculated fixed duration to send a certain amount of electrical energy to the device to eventually result in the desired outcome.

In other forms, system 100 uses devices of the appropriate power handling capabilities (IXYS CPC40055ST solid state relay) that have built in optocoupling, zero cross turn on, insulation and heat spreading to minimize build costs.

In other forms, switching devices such as relays and MOSFETs especially with new technologies such as Silicon Carbide are used. As more users share data and improve the machine learning models, fine grained control may not be needed and less expensive products that do not contain the extra circuitry can be offered. Using the zero crossing capability of the thermostat can be useful to extend the operating life of a relay if that is the switch element used.

The thermostat component of the controller of system 100 has a temperature sensor and can be programmed to operate as a thermostat independently or from an external systems controller. Many of the currently available wireless networking microcontrollers simultaneously support both Bluetooth and 802.15.4 (Thread, Zigbee) networking, so a simple installation of a single baseboard could be controlled locally by a Bluetooth app on a user's smartphone. It could also connect via Bluetooth, Thread or IP to a smart home system such as Apple Homekit or be used to easily connect the device to the mesh network.

The controller 118 can monitor the solid state element parameters such as current and temperature for safe operation and maximum life. The units can also meter power and use that information to possibly fall back to a lower temperature when a monthly power limit is close to being reached. The unit can monitor the input line voltage and send out instant warnings if it detects the voltage has been cut off. It can also not function if the baseboard is of the wrong voltage and warn the user to that effect. The systems controller can use that information to determine if there was a breaker or wiring issue or if the issue was with power delivery to the building by determining if some or all of the baseboards have lost power. The controller 118 may include security items so that it will always fail safe and not allow that part of the unit to be accessed or reprogrammed by the external network.

In other embodiments, the controller 118 can have security mechanisms to prevent a malicious attacker from attempting to possibly cause damage by fire or other means by forcing the unit to exceed a maximum temperature or being completely turned off and allowing the house to freeze. Security mechanisms may include firewalls, trusted bootloaders, encryption and other mechanisms know of those of skill in the art; software and other components designed in a manner to place maximum and minimum limits on temperature and other controlled environmental readings.

In another embodiment, controller 118 can contain a voltage and current sensing elements and use the microcontroller to determine and report on the energy usage of the heating element based on the actual building voltage and heater resistance.

In one specific form where the controller 118 functions are distributed or external, the controller components within an element such as the baseboard controller can operate the thermostat on a pre-programmed schedule if it loses its connection to the external or distributed controller elements. A controller expecting a connection to a device can notify the owner of the loss of communication so that the system can be repaired. The controller within a device or controlling a device can perform one or more safety and energy monitoring functions. It may have a watchdog timer, always fail safe to a thermostat off condition. It may have a minimum temperature setting to protect pipes from freezing. The controller element may have a room temperature sensor, preferably low on the baseboard to detect the room temperature as heat rises. It may have a temperature sensor on the switching element (triac) to prevent thermal runaway and shut the system down.

One or more controller elements may run one or more network protocols and may also be reprogrammed for whatever connectivity options are desired, or, as this is a fast growing field, they can be reprogrammed as certain protocols become more prevalent or by new owners that want to use a different control mechanism, or reprogrammed to alter their behavior.

In another form, controller 118 or an element of the controller 118 has at its disposal to manage the system one or more of:
1) A map of the system elements which can include:
   a. Baseboards—Size, location and type.
   b. Indoor temperature sensors and location.
   c. Indoor light sensors and location.
   d. Outdoor temperature sensors and location.
   e. Outdoor light sensors and location.
   f. Door sensors and location.
   g. Motion sensors to determine if a room is occupied.
   h. Appliances, computers, TVs or other devices that typically generate excess heat.
2) Access to the Internet to obtain current and forecasted weather information including:
   a. Forecast outdoor temperatures.
   b. Forecast cloud coverage.
   c. Rain, snow, fog or other precipitation.
3) Stored history of system actions and responses for example:
   a. How activating a baseboard in one room heated other rooms.
   b. How outdoor light intensity affects the room temperatures at what times of day.
4) A program set by the user of the system to vary temperatures at certain times of day and information as to how accurate or fuzzy the temperature can be.
5) Access to a home control or alarm system to know if the building is occupied including geofencing to be able to plan for when the building will be occupied in the future. It could also participate in the alarm system as heat detectors for a fire condition.

By using a well-supported smart home networking protocol, these sensors are readily and inexpensively available and can be used by this heating system as well as other systems such as a home alarm.

In another embodiment, controller 118 or an element of the controller 118 uses machine learning while operating or while monitoring but not operating the various heating or other devices under its control or intended control to gather data and develop operating models of the expected behavior of the systems under control. Some examples of learning behavior include:
1) Determining heat loss based on the indoor and outdoor temperatures, forecast temperatures, heating from the sun.
2) While powering one baseboard heater at various percentage power levels it can determine how fast the given room is brought up to temperature, how much overshoot happens when the units is turned off, how other rooms are affected by this baseboard heater.

In another embodiment, the invention controls gas or electric fireplace or the fans of wood or other combustion fireplaces as part of the homes entire heating system. The invention may also make use of sensors attached to those fireplaces.

Machine Learning Control

One advantage of having control over each baseboard or other element in the system is that one can use machine learning/neural networks to optimize system behavior. The methods and systems of the invention can use as inputs (for example):
1) Ambient Temperature of all the baseboards.
2) Element Temperature of all the baseboards.

3) Room occupancy sensors.
4) Door and window sensors.
5) Light sensors.
6) Humidity.
7) Current and Forecast weather.
8) Room set points.
9) Time of day.
10) Geofencing.
11) Energy pricing.
12) Energy availability.
13) Community Energy supplies.

The ML system would then output controls to the thermostats and monitor the progress so that any errors can be applied to the model and over time minimize energy usage while maximizing home comfort.

Machine Learning algorithms apply the various inputs described above to a neural network that transforms the inputs to various outputs that can be used to control the devices. The neural network typically has multiple levels and weights that are created using a training method. Once trained for the specific household, this can create more accurate controls. This ML system can be created on the systems controller, or in each individual thermostat controller 118.

Systems Controller

Figure 3:
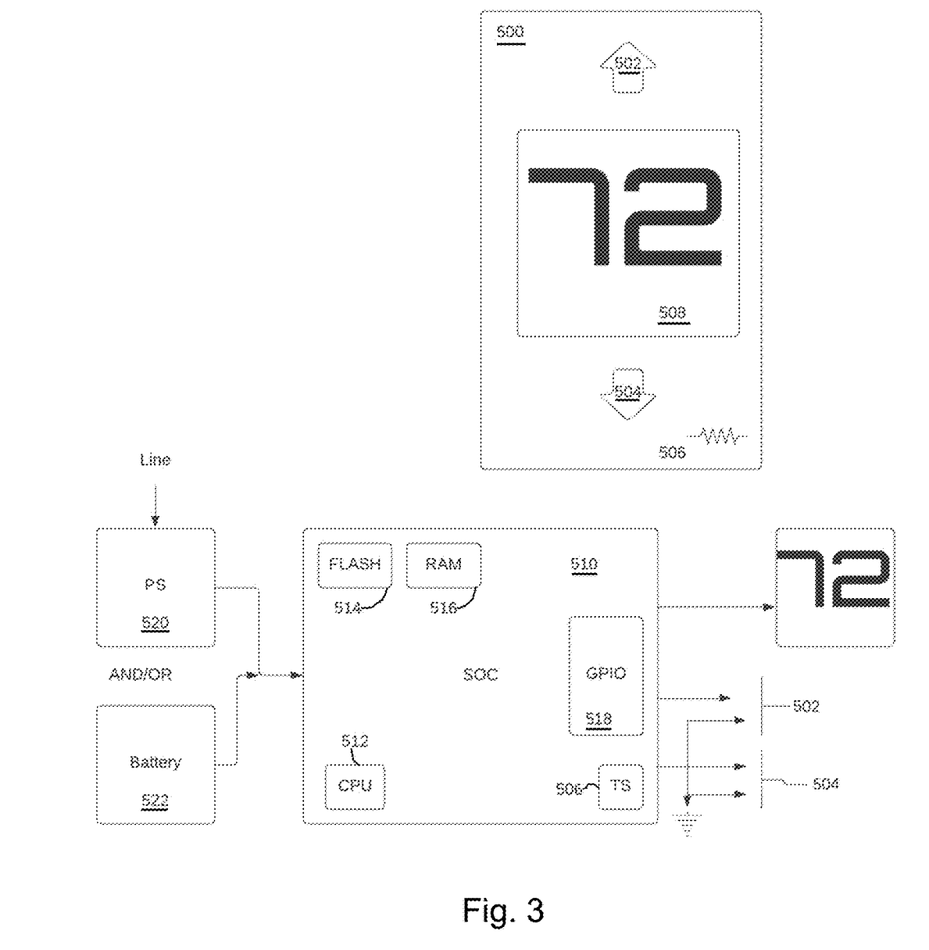
FIG. 3 is a schematic of an optional wall sensor control in accordance with the present invention.

The external or master system controller 150 can be configured as presented in FIG. 3. The master system controller 150 can be implemented as a wall unit with a display, touchscreen or simple temperature and buttons, a portable battery powered unit that the user can move around with them, which gives you a local temperature as well.

Alternatively or in addition to master system controller 150, control of system 100 can be implemented as headless unit (identified as optional system controller 160 (FIG. 1)) with no user interface that can use a house automation system (Amazon, Apple, Google) and act as the main thermostat for the house. The headless unit could also interface to the owners phone, tablet or home computer for the user interface. Some new home automation hubs can even implement edge machine learning so the house can be locally run or cloud connected depending on the privacy and wishes of the homeowner.

The master system controller 150 may be connected to the Internet either directly or through a home controller hub. This allows for remote control, geofencing and to allow it to find out weather forecast information. If the connection is down, it could use local pressure, temperature and humidity sensors to create a weather prediction of its own. The dwellings altitude and location may also influence the operation of the system 100.

The master system controller 150 then maintains a system model for controlling the house temperature. The owner can control how fast the system should conform to the comfort settings. If the owner is more concerned with energy savings, he can allow the master system controller 150 to be somewhat loose with control knowing that other factors should come in to play and adjust temperatures as well.

Using all the stored information and dynamic current information, the master system controller 150/optional system controller 160 can then decide the most efficient methods to follow the schedule that the user has selected. For example, knowing that the outdoor temperature is rising, that the sun will be coming through windows in the room soon, the system could decide to use less heating and allow the other factors to help bring the room temperature to the desired level by the desired time without significant overshoot.

The master system controller 150/optional system controller 160 could also control other elements in the household such as ceiling fans to circulate air and affect the temperature. This may be especially useful with baseboard heaters as they are a radiant heating elements creating convective heat currents. If the house was getting too warm due to outside temperatures or sun penetration, the system could open powered skylights or windows/vents to allow outside air to cool the house if possible (i.e. if they exist and it is not raining). The master system controller 150/optional system controller 160 could also do this automatically to allow fresh air into the building when the outside temperature allowed it without causing energy loss.

Further, although the invention has been described above in relation to preferred embodiments thereof, it will be understood by those skilled in the art that variations and modifications can be accomplished in these preferred embodiments without departing from the scope and spirit of the invention.

Depending on the embodiment or implementation of system 100, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A thermostat system comprising:
 a computer processor;
 computer memory associated with the computer processor;
 a network interface; and
 a plurality of temperature sensors wherein at least first one of the plurality of sensors is a heating element sensor located on a heating element and, a second one of a plurality of sensors is an ambient room temperature sensor in a space to be heated,
 wherein the computer processor is configured to:
 receive temperature data from both the first temperature sensor and the ambient room temperature sensor,
 determine, from the received temperature data, a power level that will heat the space to a user-selected temperature while maintaining the heating element temperature below a desired maximum operating temperature, and
 adjust power supplied to the heating element according to the determined power level.

2. The thermostat system of claim 1, wherein the network interface is selected from the group consisting of Powerline, Mesh, Bluetooth, Ethernet, and/or Wi-Fi.

3. The thermostat system of claim 1, wherein the computer processor controls a switch selected from the group consisting of a relay, a triac, a transistor and a zero-cross solid-state relay.

4. The thermostat system of claim 1, wherein the computer processor in an iterative process:
 receives first temperature data from the sensors,
 stores temperature data received from the sensors in the computer memory,
 determines necessary temperature settings from one or more of the electric heating elements,
 stores the temperature settings in memory,
 receives second temperature data from the sensors, and
 compares the second temperature data with data stored in memory from prior stored temperature data and prior stored temperature settings determined from historic data in memory to thereby set a subsequent temperature setting, to thereby alter temperature settings each time the iterative process runs.

5. The thermostat system of claim 1, further comprising a power switch and the heating element is an electronic heating element, wherein the power switch is connected to the electronic heating element and the computer processor adjusts power supplied from the power switch.

6. The thermostat system of claim 1, further comprising one or more fans operatively associated with the computer processor whereby the computer processor controls fan functions to adjust room temperature based on one or more signals from the temperature sensors.

7. The thermostat system of claim 1, wherein the amount power set to one electric heating element is determined by the computer processor based on signals from a respective at least two of the plurality of temperature sensors.

8. The system of claim 1, wherein the network interface operable sets the heating element to a minimum programmed temperature.

9. The system of claim 1, wherein the system controls multiple switches on line or neutral wires and sequences the switch turn on/off times to increase switch lifetime.

10. The system of claim 1 wherein during operation the system communicates a current on/off state to other systems which can then utilize their sensors to determine if the operation of the other units will affect the decisions that unit will make to adjust its operation.

11. The system of claim 1, wherein the system communicates a current on/off state to a controller system which can combine the data and signal other heating elements on how to efficiently manage the temperature.

12. The system of claim 1 further comprises a radio to communicate with external sensors and data sources including weather forecasts to alter its operation possibly by delaying the on time as it expects the temperature to rise from solar heating or outdoor temperature changes.

13. The system of claim 1 further comprises a radio to communicate with a neighborhood electrical utility in order to manage power consumption based on generation and/or battery status and/or electricity cost.

14. An electric heater control method, the method comprising:
receiving temperature data ($T_e$) from at least one heating element temperature sensor $T_e$, the temperature sensor associated with the computer processor wherein the temperature sensor sends a signal $T_e$ to the computer processor via a network interface;
receiving temperature data ($T_r$) from an ambient room temperature sensor;
computing a control signal as a function of $T_e$ and $T_r$ so as to (i) approach a target room temperature, and (ii) constrain $T_e$ to not exceed a maximum temperature for the heating element; and adjusting electrical power delivered to the heating element in accordance with the control signal;
storing the temperature data in computer memory; and
adjusting the amount of power to one or more of the electric heating elements based on signals sent to the computer processor.

15. The electric heater control method of claim 14, wherein the amount power set to one electric heating element is determined by the computer processor based on signals from a respective at least two of the plurality of temperature sensors.

16. An electric heater control method, the method comprising:
receiving temperature data from a plurality of temperature sensors, each sensor associated with a respective electric heating element, the plurality of temperature sensors associated with the computer processor wherein the temperature sensors send respective signals to the computer processor via a network interface;
storing the temperature data in computer memory; and
adjusting the amount of power to one or more of the electric heating elements based on signals sent to the computer processor;
wherein the computer processor preforming an iterative process comprising:
receiving first temperature data from the sensors by the computer processor;
storing temperature data received from the sensors in computer memory;
determining necessary temperature settings from one or more of the electric heating elements;
storing the temperature settings in memory;
receiving second temperature data from the sensors; and
comparing the second temperature data with data stored in memory from prior stored temperature data and prior stored temperature settings determined from historic data in memory to thereby set a subsequent temperature setting, to thereby alter temperature settings each time the iterative process runs.

* * * * *